US006313193B1

(12) United States Patent
Simendinger, III

(10) Patent No.: US 6,313,193 B1
(45) Date of Patent: Nov. 6, 2001

(54) ANTIFOULING COATING COMPOSITION

(75) Inventor: William H. Simendinger, III, Raleigh, NC (US)

(73) Assignee: Microphase Coatings Inc., Garner, NC (US)

(*) Notice: Subject to any disclaimer, the term of this patent is extended or adjusted under 35 U.S.C. 154(b) by 0 days.

(21) Appl. No.: 09/586,378

(22) Filed: Jun. 2, 2000

(51) Int. Cl.[7] ............................... C08K 5/35; C08K 5/20; C08K 5/04

(52) U.S. Cl. ............................ 523/122; 524/95; 524/230; 524/300; 524/322; 524/399; 524/403; 524/490; 524/494; 524/588

(58) Field of Search ................................. 524/230, 300, 524/322, 399, 494, 403, 490, 588, 95; 523/122

(56) References Cited

U.S. PATENT DOCUMENTS

| | | |
|---|---|---|
| 4,602,959 | 7/1986 | Kurita et al. . |
| 4,725,501 | 2/1988 | Rukavina et al. . |
| 4,814,017 | 3/1989 | Yoldas et al. . |
| 4,816,288 | 3/1989 | Rukavina et al. . |
| 4,990,547 | 2/1991 | Stovicek . |
| 5,068,277 | 11/1991 | Vukov et al. . |
| 5,096,488 | 3/1992 | Stovicek . |
| 5,173,110 | 12/1992 | Stovicek . |
| 5,218,059 | 6/1993 | Kishihara et al. . |
| 5,298,060 * | 3/1994 | Harakal et al. .................... 106/15.05 |
| 5,331,074 * | 7/1994 | Slater et al. ............................ 528/14 |
| 5,433,941 | 7/1995 | Patel . |
| 5,593,732 * | 1/1997 | Griffith .............................. 427/407.1 |
| 5,663,215 * | 9/1997 | Milligan ............................... 523/122 |
| 5,688,851 | 11/1997 | Kress . |
| 5,939,478 | 8/1999 | Beck et al. . |
| 5,958,116 | 9/1999 | Kishihara et al. . |
| 6,013,724 | 1/2000 | Mizutani et al. . |
| 6,045,869 | 4/2000 | Gesser et al. . |

OTHER PUBLICATIONS

*Naval Research Reviews*, Office of Naval Research, XLIX:4 1–65 (1997).

* cited by examiner

*Primary Examiner*—Kriellion A. Sanders
(74) *Attorney, Agent, or Firm*—Myers Bigel Sibley & Sajovec, P.A.

(57) ABSTRACT

An antifouling coating formulation includes a first part making up the matrix of the coating. The first part is a silicone-modified titanium silicate glass. A second part of the formulation serves to prevent barnacles and other organisms from attaching to the coating and includes a combination of liquid polymers, oils, or liquid waxes which are incompatible and will phase separate after the mixing. The materials have a chemically reactive group which serve to graft the materials into the matrix. An optional third part of the formulation includes a compound which prevents or inhibits slime formation.

19 Claims, No Drawings

ANTIFOULING COATING COMPOSITION

BACKGROUND OF THE INVENTION

1. Field of the Invention

The present invention relates to an antifouling coating composition, and more particularly to a coating composition which is coated on underwater structures such as ships, port facilities, buoys, pipelines, bridges, submarine stations, submarine oil field excavation facilities, water conduit raceway tubes in power plants, cultivating fishing nets, stationary fishing nets and the like to provide an antifouling coating which is formed on the surface of the underwater structure and which is suitable for preventing underwater living things from adhering and growing on the surface of the underwater structure.

2. Description of the Prior Art

Biofouling, the growth of barnacles, seaweeds, tubeworms and other marine organisms on the hulls of ocean-going vessels, and other underwater structures, cause the international marine community billions of dollars a year. In the case of ocean-going vessels, most of this money goes for the extra fuel needed to overcome the increased drag on vessels. Some of it is spent for hull cleaning and repainting and for the upkeep on propulsion equipment. Of the total amount of money, a tiny amount is invested in the search for better antifouling inhibitors.

One currently used hull antifouling coating contains species such as tributyltin compounds or copper oxide and function through leaching of the toxicant into the marine environment. The resulting environmental hazards of introducing such toxicants into the marine ecosystem include disruption of natural ecocycles for many commercially important shellfish and pollution of entire food chains. The removal and disposal of toxicant-containing coatings from ships and other structures also pose separate environmental hazards, driving up the cost of refurbishment.

An alternative approach is to use acrylic acid monomer compositions which are water soluble, i.e., a polyester resin with an acrylic acid group. Such coatings include a biocide, which after a certain amount of time becomes inactive. The composition, because it is water soluble, wears off over time, i.e., is ablative, and exposes new and active biocide at the surface. Such a composition is known as a self-polishing composition. Thus the alternative approach has been to employ a polymeric coating to function as a fouling release coating. Poly(dimethylsiloxane) (PDMS)-based coatings have properties which meet some of those requirements. On the other hand, as noted, studies have shown that such a cured PDMS material becomes unstable when immersed in water for three months.

Another specific approach involves the use of a composition containing a majority by weight as resin-solid content a reaction-curable silicone resin composition, a silicone resin having the specific average molecular weight and viscosity and an alkoxy group at its molecular terminal. While such a composition exhibits non-toxic characteristics, it is silicone based and in addition to the discussed disadvantages, subject to premature wear requiring frequent maintenance in the form of reapplication of the coating.

In accordance with the invention, the disadvantages of the prior art are avoided and an antifouling coating composition which is a silicone modified glass, not silicone based, is provided which is extremely effective in preventing fouling, and which is highly durable over time.

SUMMARY OF THE INVENTION

In accordance with the invention, there is provided a two-part formulation for an antifouling coating. The first part is a combination of chemical compounds which make up the matrix of the material. The matrix serves to provide a carrier or support material for at least one other part making up the composition, and optionally a third part. The matrix provides certain critical properties including, but not limited to, good adhesion to the substrate on which the coating is applied, toughness, crack resistance, durability, abrasion resistance, and stability in a aqueous environment. As contrasted to the prior art, the matrix formulation is not a silicone rubber, but is a silicone-modified titanium silicate glass which provides all of the above advantages and overcomes the disadvantages of silicone rubber-based formulations.

The second part of the formulation serves to prevent barnacles and other organisms from attaching to the coating. It is made up of a combination of liquid polymers, oils, or liquid waxes which are incompatible and will phase separate after mixing. These materials may have a chemically reactive group which can be grafted into the matrix so that the materials will riot bleed out into the surrounding environment where combined with the first part, applied as a coating and allowed to cure on the surface thus coated.

An optional third part of the formulation is made up of chemical compounds that prevent or inhibit slime such as algae, bacteria, protozoa, diatoms, etc. from growing on the surface of the coating. While in most cases, the third part will be included in the composition, there are instances when slime is not an issue, and the third part components can be omitted.

In a more specific aspect, the first part of the antifouling coating is made up of a glass composition of titanium silicate glass modified with a hydro or hydroxy functionalized silicone polymer. The glass composition is formed using a Sol-Gel process employing an organotitanate compound, for example, a titanium alkoxide compound such as titanium methoxide, titanium ethoxide, titanium isopropoxide, titanium propoxide, titanium butoxide, titanium ethylhexoxide, or any other type of titanium alkoxide compound. These titanium alkoxide compounds can be used separately or in any combination. Although alkoxide is given as examples, other organotitanate compounds can be used. Also forming the glass is a polydiethoxysiloxane polymer which serves to create cross linking with the titanate. The first part also includes a carboxylic acid compound. Silica gel is optional to inhibit the crosslinking reaction. Silica gel is used if storage over a long period of time is an issue. This is because it stores moisture.

Alternatively, only silica gel can be used in place of the carboxylic acid compound. However, this does not work as well and a lot of silica gel is required.

With respect to the Sol-Gel process, as is well know to those of ordinary skill in the art, the Sol-Gel process is conventional, and typically produces a Sol-Gel glass which results from an optically transparent amorphous silica or silicate material produced by forming interconnections in a network of colloidal submicrometer particles under increasing viscosity until the network becomes completely rigid, with about one-half the density of glass.

For the second part of the composition, about 1% to about 30% by weight of the total coating composition, more preferably about 10% to about 20%, is made up of any one or more of the following microphase separated materials which can be added to the matrix composition of part one. One material can be a vinyl terminated polydimethylsiloxane polymer which has been reacted in a specific manner. A similarly-reacted methylhydrosiloxane polymer can also be employed. Any hydrocarbon compound having a chain of carbon atoms of up to C20 can be used, and polydecene can also be used. Certain kinds of organic fatty acids can also make up part two of the composition, and can include an acid such as octanoic acid or oleic acid or similar type acids. Finally, aluminum oleate may also be preferred to be added. Alternatively, other materials can be added including any fatty acid salt complex. The materials listed with respect to the second part of the coating composition can be added to the matrix in any combination desired.

Part three of the composition includes chemical elements or compounds which are typically slime inhibitors, as has been previously described, and are discussed in greater detail hereafter. Part three of the composition is optional, as previously noted, and can make up anywhere from about 0.1% to about 10% by weight of the total coating composition, and the materials of part three of the composition can be one material or a combination of various materials which serve as slime preventers. If a silver compound, as discussed hereafter, is used for part three of the composition, then the amount will be in the lower end of the range, but more typically when other compounds not containing silver are used, the percentage by weight of part three of the composition is typically about 3% to about 10%.

DETAILED DESCRIPTION OF THE INVENTION

The present invention will be more fully understood by reference to the following description and examples. Variations and modifications of the embodiments of the invention can be substituted without departing from the principles of the invention, as will be evident to those skilled in the art.

The present invention is based on the discovery that a modified glass matrix can be combined with other components to make a uniform and tough antifouling coating for use on surfaces, particularly marine surfaces in an underwater environment.

As already previously discussed, the formulation for the antifouling coating in accordance with the invention can be broken down into at least two, and optionally, three separate parts. The first part is made up of a combination of chemical compounds, which make up the matrix of the material. The matrix serves to provide a carrier or support material for the second part, and optionally the third part of the formulation. The matrix provides critical properties such as good adhesion to the substrate on which the formulation is applied as a coating, toughness, crack resistance, durability, abrasion resistance and stability in an aqueous environment. More specifically, the matrix formulation is a silicone-modified titanium silicate glass.

Part two of the formulation serves to prevent barnacles or other organisms from attaching to the coating and includes a combination of liquid polymers, oils, or liquid waxes which are incompatible and will phase separate after mixing. These materials should have a chemically reactive group, which can be grafted into the matrix such that the materials will not bleed out into the surrounding environment.

The final part of the formulation is made up of a chemical compound that prevents or inhibits slime such as algae, bacteria, protozoa, diatoms, etc. from growing on the surface of the coating.

As already discussed, the first part of the formulation is a titanium silicate glass modified with a hydro functionalized or hydroxy functionalized silicone polymer. The glass composition is formed using a Sol-Gel process comprised of a titanium alkoxide compound, such as titanium methoxide, titanium ethoxide, titanium isopropoxide, titanium propoxide, titanium butoxide, titanium ethylhexoxide, or any other type of titanium alkoxide compound. These materials can be used separately or in various combinations.

Under ordinary conditions, titanium silicate glass is easy to crack. Thus, polymers are employed in the first part of the composition and serve to reinforce the glass. These above-noted titanium silicate glass compounds typically make up about 30% to about 70%, and most preferably about 50% to 55%, by weight with reference to a polymer used to form the glass, i.e., of the condensed titanate material (glass), and not the precursor materials. In a preferred aspect, titanium isopropoxide is a preferred material for use in the Sol-Gel process. The second compound used to form the glass, in addition to silicone polymer, is a polydiethoxysiloxane polymer which serves to provide cross-linking for the titanium silicate glass system. In addition, the matrix formulation also includes propionic or octonoic acid in silica gel which is optional and which is used to inhibit the cross-linking reaction which occurs, so that for example, the surface to be coated can be painted before the formulation cures. Other materials in the first part which complete the matrix formulation is ground mica powder. Alternatively, silica, kaolin, bentonite, zinc oxide, iron oxide, or other appropriate fillers, as will be readily apparent to those of ordinary skill in the art, can be used.

Thus, set forth below is a typical standard formulation for the first part of the system, which can include the following:

| % by Weight: | Component: |
| --- | --- |
| 16.4 | 100 centistokes polydimethylsiloxane silanol terminated |
| 5.6 | octanoic acid or propionic acid |
| 22.0 | polydiethoxysiloxane |
| 2.8 | silica gel (optional) |
| 23.3 | titanium isopropoxide |
| 29.9 | mica (muscovite) |

As may be appreciated, in providing the formulation to an end user, the titanium isopropoxide is maintained separate from the other components, particularly the polydimethyl siloxane silanol terminated and the polydiethoxy siloxane, to prevent the matrix from cross linking and setting, such that all of the other components making up the formulation, including parts two and three, can later be mixed together by an end user, in whatever mixture is appropriate provided the above-mentioned components are kept separate and the formulation can then either be brushed, rolled or sprayed onto the surface which is being coated. With respect to the amounts indicated above for the polydimethylsiloxane silanol terrminated, that amount can vary by about 10% to about 15% from the noted amount for the formulation given as an example.

The second part of the formulation is made up of microphase separated materials which can be added in a range of about 1% to about 30% by weight of the matrix composition. More preferably, the amount of the second part of the formulation is about 10% to about 20% by weight of the total composition, and this range provides the best physical properties. More specifically, while certain applications warrant using the outer ends of the ranges, in a typical coating formulation, an amount of 30% generally provides a coating which is too soft, while 1% provides a coating which has limited fouling resistance.

One material which can be used for the second part of the formulation is a vinyl terminated polydimethylsiloxane polymer which has been reacted with dimethylethoxy silane and triethyl silane using a platinum-activated hydrosilylation reaction. This provides a mono-functionalized silicone polymer which is functionally terminated at only one end of the molecule, and which can be chemically grafted on one end into the matrix. Another microphase separated material which can be employed is a methylhydrosiloxane polymer which is side-chain grafted with octene and vinyltriethoxy silane using a platinum-activated hydrosilylation reaction. Similarly, any hydrocarbon compound having a carbon atom chain of up to C20 can be used. Yet still further a methylhydrosiloxane polymer which is side-chain grafted with styrene and vinyltriethoxy silane using a platinum-activated hydrosilylation reaction can also be used. In this regard, it is noted that the platinum catalyst serves to react the hydride and the vinyl in the initial formulation. No platinum curing occurs in the final product provided in the field. Yet still further, a liquid hydrocarbon, such as polydecene, can also be used. In addition, other materials such as octanoic acid, heptanoic acid, hexanoic acid, decanoic acid, lauric acid, oleic acid, linoleic acid, linolenic acid, stearic acid, or any carboxylic acid containing a linear carbon chain of up to about C20 can be employed. Similarly, aluminum oleate, aluminum stearate, copper oleate, copper stearate or any fatty acid salt complex can be employed. In this regard, it is noted that of the above components, oleic acid is preferred as is aluminum oleate.

These two parts are typically mixed together to be applied as the coating. Optionally, the third part of the formulation can be mixed either with the first or the second part, as well as also adding mica to either part one or part two of the formulation prior to its being applied as a coating. In this regard, all of the materials listed with respect to the second part of the formulation can be added to the matrix in any combination desired.

The third part of the formulation may be made up of the following chemical elements or compounds in any combination and are added in an amount of from about 0.1% to about 10% by weight of the total formulation:

Silver powder
Silver oxide
Silver chloride
Silver carbonate
Silver acetate
Silver citrate
Cetrimide
Isoniazid
Benzalkonium chloride
Sulfanilamide
Sulfaguanidine
Sulfathiazole
Sulfacetamide
Sulfabenzamide
Sulfamethiazole
Any sulfa-based antimicrobial compound
Irgarol™, which is a slime inhibitor manufactured by and commercially available from Ciba Geigy As may be appreciated, in the event a silver compound is used, the lower range close to about 0.1% by weight will be used because of the expense. When silver is not used, the other materials can be used in an amount of about 3% to about 10% by weight of the formulation. As may be appreciated in some cases where slime is not an issue, these materials may not be used if not needed for the specific application.

Additional additives which can be added to the formulation can include aminopropyltriethoxy silane which serves to increase adhesion and can be used, for example, when the coating composition is used on the running gear of a vessel. Fumed silica can be used for thixotropic control, i.e., to increase viscosity. Pigments can be used to alter the color, and certain phosphates can also be added for anticorrosion properties.

EXAMPLES

The present invention is illustrated in greater detail by the following examples and comparative examples, in which "part" means "part by weight" unless otherwise expressed. The examples are not to be construed as limiting the scope of the present invention.

For the examples and comparative examples, the initial formulations were prepared in two parts, a first part being the matrix formulation which includes the glass which is about 50% by weight titanium silicate and 50% by weight polydimethylsiloxane, in the cured state, with respect to each other, and part two being as described further herein, and including either in part one or part two the optional three components which are all then mixed together to allow the formulation to be applied as a coating.

Example 1

| % by Weight: | Component: |
| --- | --- |
| 14.35 | 100 cs polydimethylsiloxane silanol terminated |
| 4.91 | octanoic acid or propionic acid |
| 19.25 | polydiethoxysiloxane |
| 2.45 | silica gel |
| 20.38 | titanium isopropoxide |
| 26.16 | mica (muscovite) |
| 5.0* | 1000 cs polydimethylsiloxane (triethyl silane and dimethyl ethoxy silane terminated) |
| 5.0* | poly (octylmethyl-co-vinyltriethoxy silane methyl siloxane) |
| 2.5 | silver powder |

Example 2

| % by Weight: | Component: |
| --- | --- |
| 16.43 | titanium isopropoxide |
| 8.15 | oleic acid |
| 15.50 | polydiethoxy siloxane |
| 25.83 | mica (50 micron) |
| 11.59 | 100 cs polydimethylsiloxane silanol terminated |
| 10.0* | poly (octylmethyl-co-vinyltriethoxy silane methyl siloxane) |
| 10.0* | 1000 cs polydimethylsiloxane (triethyl silane and dimethyl ethoxy silane terminated) |
| 2.5 | silver oxide (1.0 micron) |

*Phase separate components

Example 3

| % by Weight: | Component: |
| --- | --- |
| 18.55 | titanium isopropoxide |
| 9.20 | oleic acid |

-continued

| % by Weight: | Component: |
|---|---|
| 17.49 | polydiethoxy siloxane |
| 29.21 | mica (50 micron) |
| 13.05 | 100 cs polydimethylsiloxane silanol terminated |
| 5.0* | poly (octylmethyl-co-vinyltriethoxy silane methyl siloxane) |
| 5.0* | 1000 cs polydimethylsiloxane (triethyl silane and dimethyl ethoxy silane terminated) |
| 2.5 | Silver oxide (1.0 micron) |

*Phase separate components

Example 4

| % by Weight: | Component: |
|---|---|
| 17.48 | titanium isopropoxide |
| 8.76 | oleic acid |
| 16.48 | polydiethoxy siloxane |
| 27.54 | mica (50 micron) |
| 11.27 | 100 cs polydimethylsiloxane silanol terminated |
| 3.74* | poly (octylmethyl-co-vinyltriethoxy silane methyl siloxane) |
| 11.27* | 1000 cs polydimethylsiloxane (triethyl silane and dimethyl ethoxy silane terminated) |
| 2.5 | silver oxide (1.0 micron) |

*Phase separate components

Example 5

| % by Weight: | Component: |
|---|---|
| 17.48 | titanium isopropoxide |
| 8.67* | oleic acid |
| 16.48 | polydiethoxy siloxane |
| 27.55 | mica (50 micron) |
| 12.32 | 100 cs polydimethylsiloxane silanol terminated |
| 10.0* | 100 cs polydimethylsiloxane (triethyl silane and dimethyl ethoxy silane terminated) |
| 2.5 | silver oxide (1.0 micron) |

*Phase separate components

Example 6

| % by Weight: | Component: |
|---|---|
| 16.93 | titanium isopropoxide |
| 4.3 | heptanoic acid |
| 15.99 | polydiethoxy siloxane |
| 28.36 | mica (50 micron) |
| 11.92 | 100 cs polydimethylsiloxane silanol terminated |
| 20.0* | poly (octyl methyl-co-ethylbenzene methyl-co-vinyl triethoxysilane methyl siloxane) |
| 2.5 | silver powder (1.0 micron) |

*Phase separate components

Example 7

| % by Weight: | Component: |
|---|---|
| 17.94 | titanium isopropoxide |
| 10.0* | oleic acid |
| 16.94 | polydiethoxy siloxane |
| 30.0 | mica (50 micron) |
| 12.62 | 100 cs polydimethylsiloxane silanol terminated |
| 10.0* | 1000 cs polydimethylsiloxane (triethyl silane and dimethyl ethoxy silane terminated) |
| 2.5 | silver powder (1.0 micron) |

*Phase separate components

Example 8

| % by Weight: | Component: |
|---|---|
| 16.93 | titanium isopropoxide |
| 4.30 | heptanoic acid |
| 15.99 | polydiethoxy siloxane |
| 28.36 | mica (50 micron) |
| 11.92 | 100 cs polydimethylsiloxane silanol terminated |
| 10.0* | polydecene |
| 10.0* | 1000 cs polydimethylsiloxane (triethyl silane and dimethyl ethoxy silane terminated) |
| 2.5 | silver powder (1.0 micron) |

*Phase separate components

Example 9

| % by Weight: | Component: |
|---|---|
| 16.93 | titanium isopropoxide |
| 4.30 | heptanoic acid |
| 15.99 | polydiethoxy siloxane |
| 28.39 | mica (50 micron) |
| 11.92 | 100 cs polydimethylsiloxane silanol terminated |
| 5.0* | aluminum oleate |
| 15.0* | 1000 cs polydimethylsiloxane (triethyl silane and dimethyl ethoxy silane terminated) |
| 2.5 | silver powder (1.0 micron) |

*Phase separate components

Example 10

| % by Weight: | Component: |
|---|---|
| 18.75 | titanium isopropoxide |
| 17.70 | polydiethoxy siloxane |
| 4.88 | propionic acid |
| 29.51 | mica (muscovite) |
| 16.61 | 100 cs polydimethylsiloxane silanol terminated |
| 10.0* | 1000 cs polydimethylsiloxane-dimethyl ethoxy silane terminated |
| 3.0 | benzalkonium chloride* |

*Benzalkonium chloride contains alkyl carbon chains from C14 to C20. As a result, this material can be both a phase separation component and an effective slimicide.

As may be appreciated, in order to commercially provide the components for the coating, they must be kept separated so that a reaction does not occur prior to application on a surface. Thus, a typical commercial product is provided in two parts as follows:

Example 11

| % by Volume of A | % by Volume of A&B | Component |
|---|---|---|
| Part A % by Volume of A | | |
| 32.00 | 16.16 | 100 cs polydimethylsiloxane silanol terminated |
| 19.77 | 10.00 | 1000 cs polydimethylsiloxane dimethyl ethoxy silane terminated |
| 35.34 | 17.70 | polydiethoxy siloxane |
| 12.88 | 29.51 | mica |
| Part B % by Volume of B | | |
| 37.90 | 18.75 | titanium isopropoxide |
| 9.87 | 4.88 | propionic acid |
| | 17.70 | polydiethoxy siloxane |
| 6.10 | 3.00 | benzalkonium chloride |
| 46.13 | 29.51 | mica |

In preparing the mixture for being applied, parts A and B, for all formulations, should be combined and mixed using a mechanical mixing device for about three (3) to about five (5) minutes. Such a device can be a paint shaker, electrically powered stirrer or like device. After mixing, the coating can be kept in a sealed container for up to about six (6) hours before use. When applied, for example, with brush, roller, or sprayer, curing of the coating occurs rapidly as it is fashioned into a thin layer on the surface. The coating will be substantially tack free in about fifteen (15) to about thirty (30) minutes, and will be serviceable after about twenty-four (24) hours. Increased temperature and/or humidity will increase the cure rate, but the coating can still be applied at temperatures of about 32° F. to about 100° F.

In the previous discussion specific viscosities have been given for the hydro or hydroxy functionalized silicones. However, the formulation for the hydro or hydroxy functional silicones is not limited to those viscosities and can range from about 20 to about 115,000 centistokes. In terms of molecular weight, this corresponds to a molecular weight of about 400 g/mol to about 140,000 g/mol. The vinyl functionalized silicone polymers are typically described previously as being 1000 centistokes, but can also range from about 0.7 centistokes to about 165,000 centistokes, or about 186 g/mol to about 155,000 g/mol.

With respect to titanate silicate ratios, the ratio of the titanate to silicate can vary from about 1 mol % of the reactive titanate groups to about 99 mol % reactive silicate groups to about 99 mol % of the reactive titanate groups to about 1 mol % of the reactive silicate groups. An example of this is as follows. Polydiethoxy siloxane contains two reactive groups per molecular repeat unit. Titanium isopropoxide contains four (4) reactive molecular groups per molecule. A fifty percent (50%) ratio of the reactive groups would mean that there would be one half (½) mole of titanium isopropoxide per 1 mole polydiethoxy siloxane molecular repeat units. A twenty-five percent (25%) ratio would mean that there would be one (1) mole of titanium isopropoxide per six (6) moles of polydiethoxy siloxane repeat units. In this regard a preferred ratio would be about 50/50, with a most preferred ratio being about 25 titanate and about 75 silicate. The most preferred ratio enhances bonding to the filler material.

In terms of two-part commercial availability as discussed above, other two-part formulations are set forth in the following additional examples.

Example 12

| | Component: |
|---|---|
| Part A Volume % A | |
| 21.34 | 100 cs polydimethyl siloxane-silanol terminated |
| 38.96 | poly(octyl methyl-co-ethylbenzene methyl-co-methyl vinyl triethoxy silane siloxane) |
| 29.39 | polydiethoxy siloxane |
| 10.30 | mica (muscovite) |
| Part B Volume % B | |
| 64.09 | titanium isopropoxide |
| 16.59 | heptanoic acid |
| | Polydiethoxy Siloxane |
| 19.32 | mica (muscovite) |

Mix Ratio is 64.65% A to 35.35% B by volume
This commercial embodiment corresponds to Example 5 as previously described.

Example 13

| | Component: |
|---|---|
| Part A Volume % A | |
| 28.77 | 100 cs polydimethyl siloxane-silanol terminated |
| 22.80 | 1000 cs polydimethyl siloxane (triethyl silane and dimethyl ethoxy terminated) |
| 35.67 | poly(diethoxy siloxane) |
| 12.76 | mica (muscovite) |
| Part B Volume % B | |
| 52.50 | titanium isopropoxide |
| 30.73 | oleic acid |
| | poly (diethoxy siloxane) |
| 15.81 | mica (muscovite) |
| 0.96 | silver powder (1.0 micron) |

Mix ratio is 55.35% A to 44.65 B by volume
This commercial embodiment corresponds to Example 6 as previously described.

Example 14

| | Component: |
|---|---|
| Part A Volume % A | |
| 22.23 | 100 cs polydimethyl siloxane-silanol terminated |
| 18.64 | 1000 cs polydimethyl siloxane (triethyl silane and dimethyl ethoxy terminated) |
| 21.70 | poly(decene) |
| 27.55 | poly(diethoxy siloxane) |
| 9.87 | mica (muscovite) |
| Part B Volume % B | |
| 63.28 | titanium isopropoxide |
| 16.38 | heptanoic acid |
| | poly (diethoxy siloxane) |
| 19.12 | mica (muscovite) |
| 1.22 | silver powder (1.0 micron) |

Mix Ratio is 65.95% A to 34.05% B by volume
This commercial embodiment corresponds to Example 7 as previously described.

Example 15

| Component: | |
|---|---|
| Part A | |
| Volume % A | |
| 25.34 | 100 cs polydimethyl siloxane-silanol terminated |
| 31.94 | 1000 cs polydimethyl siloxane (triethyl silane and dimethyl ethoxy terminated) |
| 31.46 | poly(diethoxy siloxane) |
| 11.26 | mica (muscovite) |
| Part B | |
| Volume % B | |
| 53.87 | titanium isopropoxide |
| 13.95 | heptanoic acid |
| | poly (diethoxy siloxane) |
| 14.90 | aluminum oleate |
| 16.25 | mica (muscovite) |
| 1.03 | silver powder (1.0 micron) |

Mix ratio is 59.07% A to 40.93% B by volume

This commercial embodiment corresponds to Example 8 as previously described.

Example 16

| Component: | |
|---|---|
| Part A | |
| Volume % A | |
| 23.07 | 100 cs polydimethyl siloxane-silanol terminated |
| 19.71 | 1000 cs polydimethyl siloxane (triethyl silane and dimethyl ethoxy terminated) |
| 19.71 | poly(octyl methyl-co-methyl vinyl triethoxy silane siloxane) |
| 28.23 | poly(diethoxy siloxane) |
| 9.28 | mica (muscovite) |
| Part B | |
| Volume % B | |
| 54.82 | titanium isopropoxide |
| 28.58 | oleic acid |
| | poly (diethoxy siloxane) |
| 15.53 | mica (muscovite) |
| 1.07 | silver powder (1.0 micron) |

Mix ratio is 62.05% A to 37.95% B by Volume

This commercial embodiment corresponds to Example 1 as previously described.

Example 17

| Component: | |
|---|---|
| Part A | |
| Volume % A | |
| 29.22 | 100 cs polydimethyl siloxane-silanol terminated |
| 11.18 | 1000 cs polydimethyl siloxane (triethyl silane and dimethyl ethoxy terminated) |
| 11.18 | poly(octyl methyl-co-methyl vinyl triethoxy silane siloxane) |
| 36.19 | poly(diethoxy siloxane) |
| 12.23 | mica (muscovite) |
| Part B | |
| Volume % B | |
| 54.83 | titanium isopropoxide |
| 28.62 | oleic acid |
| | poly (diethoxy siloxane) |
| 15.57 | mica (muscovite) |
| 0.98 | silver powder (1.0 micron) |

Mix ratio is 56.05% A to 43.95% B by volume

This commercial embodiment corresponds to Example 2 as previously described.

Example 18

| Component: | |
|---|---|
| Part A | |
| Volume % A | |
| 24.19 | 100 cs polydimethyl siloxane-silanol terminated |
| 24.19 | 1000 cs polydimethyl siloxane (triethyl silane and dimethyl ethoxy terminated) |
| 8.03 | poly(octyl methyl-co-methyl vinyl triethoxy silane siloxane) |
| 32.56 | poly(diethoxy siloxane) |
| 11.04 | mica (muscovite) |
| Part B | |
| Volume % B | |
| 54.80 | titanium isopropoxide |
| 28.58 | oleic acid |
| | poly (diethoxy siloxane) |
| 15.57 | mica (muscovite) |
| 1.05 | silver powder (1.0 micron) |

Mix ratio is 58.74% A to 41.26% B by volume

This commercial embodiment corresponds to Example 3 as previously described.

Example 19

| Component: | |
|---|---|
| Part A | |
| Volume % A | |
| 28.86 | 100 cs polydimethyl siloxane-silanol terminated |
| 23.43 | 1000 cs polydimethyl siloxane (triethyl silane and dimethyl ethoxy terminated) |
| 35.67 | poly(diethoxy siloxane) |
| 12.04 | mica (muscovite) |
| Part B | |
| Volume % B | |
| 54.80 | titanium isopropoxide |
| 28.59 | oleic acid |
| | poly (diethoxy siloxane) |
| 15.57 | mica (muscovite) |
| 1.04 | silver powder (1.0 micron) |

Mix ratio is 56.39% A to 43.61% B by volume

This commercial embodiment corresponds to Example 4 as previously described.

Example 20

| % by Weight: | Component: |
|---|---|
| 15.27 | titanium isopropoxide |
| 3.98 | propionic acid |
| 28.77 | polydiethoxy siloxane |
| 24.75 | mica (50 micron) |
| 17.19 | 100 cs polydimethyl siloxane-silanol terminated |
| 5.02* | 1000 cs polydimethyl siloxane (triethyl silane and dimethyl ethoxy silane terminated) |
| 5.02* | benzalkonium chloride |

*phase separation components

This total formulation would be provided commercially in two parts as follows:

| | Component: |
|---|---|
| Part A Volume % A | |
| 32.18 | 100 cs polydimethyl siloxane-silanol terminated |
| 9.41 | 1000 cs polydimethyl siloxane (triethyl silane and dimethyl ethoxy terminated) |
| 49.77 | poly(diethoxy siloxane) |
| 8.64 | mica (muscovite) |
| Part B Volume % B | |
| 53.88 | titanium isopropoxide |
| 13.26 | propionic acid |
| | poly (diethoxy siloxane) |
| 15.73 | mica (muscovite) |
| 17.13 | benzalkonium chloride |

Mix ratio is 64.55%A to 35.45% B by volume

Example 21

| % by Weight: | Component: |
|---|---|
| 13.93 | titanium isopropoxide |
| 3.6 | propionic acid |
| 26.25 | polydiethoxy siloxane |
| 22.58 | mica (50 micron) |
| 23.56 | 100 cs polydimethyl siloxane-silanol terminated |
| 5.02* | 1000 cs polydimethyl siloxane (triethyl silane and dimethyl ethoxy silane terminated) |
| 5.02* | benzalkonium chloride |

*phase separation components

This total formulation would be provided commercially in two parts as follows:

| | Component: |
|---|---|
| Part A Volume % A | |
| 37.96 | 100 cs polydimethyl siloxane-silanol terminated |
| 8.09 | 1000 cs polydimethyl siloxane (triethyl silane and dimethyl ethoxy terminated) |
| 39.07 | poly(diethoxy siloxane) |
| 6.78 | mica (muscovite) |
| 8.01 | benzalkonium chloride |

| | Component: |
|---|---|
| Part B Volume % B | |
| 64.96 | titanium isopropoxide |
| 16.04 | propionic acid |
| | poly (diethoxy siloxane) |
| 19.00 | mica (muscovite) |

Mix ratio is 73.65% A to 26.35% B by volume

Example 22

| % by Weight: | Component: |
|---|---|
| 14.72 | titanium isopropoxide |
| 3.84 | propionic acid |
| 27.74 | polydiethoxy siloxane |
| 23.86 | mica (50 micron) |
| 16.57 | 100 cs polydimethyl siloxane-silanol terminated |
| 10.28* | 1000 cs polydimethyl siloxane (triethyl silane and dimethyl ethoxy silane terminated) |
| 2.99* | benzalkonium chloride |

*phase separation components

This total formulation would be provided commercially in two parts as follows:

| | Component: |
|---|---|
| Part A Volume % A | |
| 29.11 | 100 cs polydimethyl siloxane-silanol terminated |
| 18.06 | 1000 cs polydimethyl siloxane (triethyl silane and dimethyl ethoxy terminated) |
| 45.02 | poly(diethoxy siloxane) |
| 7.81 | mica (muscovite) |
| Part B Volume % B | |
| 57.65 | titanium isopropoxide |
| 14.22 | oleic acid |
| | poly (diethoxy siloxane) |
| 16.82 | mica (muscovite) |
| 11.31 | benzalkonium chloride |

Mix ratio is 68.28% A to 31.72% B by volume

Example 23

| % by Weight: | Component: |
|---|---|
| 15.18 | titanium isopropoxide |
| 4.00 | propionic acid |
| 28.59 | polydiethoxy siloxane |
| 24.60 | mica (50 micron) |
| 17.08 | 100 cs polydimethyl siloxane-silanol terminated |
| 10.59 | 1000 cs polydimethyl siloxane (triethyl silane and dimethyl ethoxy silane terminated) |

This total formulation would be provided commercially in two parts as follows:

| Component: | |
|---|---|
| Part A Volume % A | |
| 29.12 | 100 cs polydimethyl siloxane-silanol terminated |
| 18.05 | 1000 cs polydimethyl siloxane (triethyl silane and dimethyl ethoxy terminated) |
| 45.01 | poly(diethoxy siloxane) |
| 7.82 | mica (muscovite) |
| Part B Volume % B | |
| 64.90 | titanium isopropoxide |
| 16.15 | propionic acid |
|  | poly (diethoxy siloxane) |
| 18.95 | mica (muscovite) |

Mix Ratio is 70.8% A to 29.2% B by volume

Example 24

| % by Weight: | Component: |
|---|---|
| 17.36 | titanium isopropoxide |
| 4.00 | heptanoic acid |
| 16.39 | polydiethoxy siloxane |
| 27.32 | mica (50 micron) |
| 14.97 | 100 cs polydimethyl siloxane-silanol terminated |
| 7.49* | 1000 cs polydimethyl siloxane (triethyl silane and dimethyl ethoxy silane terminated) |
| 7.49* | 500 cs poly (15% diphenyl-co-dimethyl siloxane) (triethyl silane and dimethyl ethoxy silane terminated) |
| 4.99 | benzalkonium chloride |

*phase separation components

This total formulation would be provided commercially in two parts as follows:

| Component: | |
|---|---|
| Part A Volume % A | |
| 29.84 | 100 cs polydimethyl siloxane-silanol terminated |
| 14.92 | 1000 cs polydimethyl siloxane (triethyl silane and dimethyl ethoxy terminated) |
| 14.92 | 500 cs poly (15% diphenyl-co-dimethyl siloxane) (triethyl silane and dimethyl ethoxy silane terminated) |
| 30.16 | poly(diethoxy siloxane) |
| 10.16 | mica (muscovite) |
| Part B Volume % B | |
| 55.68 | titanium isopropoxide |
| 13.10 | heptanoic acid |
|  | poly(diethoxy siloxane) |
| 15.77 | mica (muscovite) |
| 15.45 | benzalkonium chloride |

Mix ratio is 60.85% a to 39.15% B by volume

What is claimed is:

1. An antifouling coating composition, comprising:
a) a glass composition of titanium silicate glass modified with a hydro functionalized silicone polymer or a hydroxy functionalized silicone polymer; and
b) about 1% to about 30% by weight of the composition made up of at least one of: (1) a vinyl terminated polydimethylsiloxane polymer which has been reacted with dimethylethoxy silane and triethyl silane using a platinum-activated hydrosilylation reaction, (2) a methylhydrosiloxane polymer which has been side-chain grafted with octene and vinyltriethoxy silane using a platinum-activated hydrosilylation reaction, (3) a hydrocarbon compound containing a carbon chain up to about C20, (4) a methyl hydrosiloxane polymer which has been side-chain grafted with styrene and vinyltriethoxy silane using a platinum-activated hydrosilylation reaction, (5) polydecene, (6) at least one of octanoic acid, heptanoic acid, propionic acid, hexanoic acid, decanoic acid, lauric acid, oleic acid, linoleic acid, linolenic acid, stearic acid, and a caboxylic acid containing a carbon chain up to about C20, and (7) at least one of aluminum oleate, aluminum stearate, copper oleate and copper stearate.

2. The antifouling composition of claim 1, further comprising about 0.1% to about 10% by weight of the composition made up of at least one of silver powder, silver oxide, silver chloride, silver carbonate, silver acetate, silver citrate, benzalkonium chloride, sulfanilamide, sulfaguanadine, sulfathiazole and a quarternary amine anti-slime agent.

3. The antifouling coating composition of claim 1, wherein part (a) of said composition comprises: 100 centistokes silanol terminated polydimethylsiloxane; octanoic acid or propionic acid; polydiethoxysilane; silica gel; titanium isopropoxide; and mica.

4. The antifouling composition of claim 2, wherein part (b) of said composition comprises: monoethoxy terminated polydimethylsiloxane; and polymethylhydrosiloxane graft octene graft vinyl triethoxy silane polymer.

5. The antifouling coating composition of claim 4, further comprising silver powder.

6. The antifouling coating composition of claim 1, wherein said composition comprises 100 cs silanol terminated polydimethylsiloxane, oleic acid, 1000 cs polydimethylsiloxane (triethyl silane and dimethyl ethoxy silane terminated), poly (octylmethyl-co-vinyltriethoxy silane methyl siloxane), polydiethoxysiloxane, titanium isopropoxide, mica, and silver oxide.

7. The antifouling coating composition of claim 1, wherein said composition comprises 100 cs silanol terminated polydimethylsiloxane, heptanoic acid, polydiethoxy siloxane, poly(octylmethyl-co-ethylbenzene methyl-co-vinyl triethoxysilane methyl siloxane), titanium isopropoxide, mica and silver power.

8. The antifouling coating composition of claim 1, wherein said composition comprises 100 cs silanol terminated polydimethylsiloxane, oleic acid, 1000 cs polydimethylsiloxane (triethyl silane and dimethyl ethoxy silane terminated), polydiethoxy siloxane, titanium isopropoxide, mica, and silver powder.

9. The antifouling coating composition of claim 1, wherein said composition comprises 100 cs silanol terminated polydimethylsiloxane, heptanoic acid, 1000 cs polydimethylsiloxane (triethyl silane and dimethyl ethoxy silane terminated), polydiethoxy siloxane, titanium isopropoxide, mica, polydecene and silver power.

10. The antifouling coating composition of claim 9 further comprising aluminum oleate.

11. The antifouling coating composition of claim 5 wherein said composition further comprises by weight: about 16% to about 19% of titanium isopropoxide; about 8% to about 9% of oleic acid; about 15% to about 18% of polydiethoxysiloxane; about 25% to about 30% of about 50 micron mica; about 11% to about 13% of 100 cs silanol terminated polydimethylsiloxane; about 3% to about 10% of poly (octylmethyl-co-vinyltriethoxy silane methyl siloxane); about 5% to about 10% of 1000 cs polydimethylsiloxane (triethyl silane and dimethyl ethoxy silane terminated); and about 2.5% about 1 micron silver oxide.

12. The antifouling coating composition of claim 1 wherein said glass composition further comprises 100 cs silanol terminated polydimethylsiloxane, octanoic acid, polydiethoxy siloxane, silica gel, titanium isopropoxide and mica.

13. The antifouling coating composition of claim 12 further comprising at least one of aminopropytriethoxy silane, fumed silica, pigments and phosphates.

14. The antifouling coating composition of claim 1 wherein said about 1% to about 30% by weight of paragraph (b) of the composition is about 10% to about 20% by weight of the composition.

15. A kit for forming a formulation to be applied to a surface to result in an antifouling coating, comprising:

a first mixture to be mixed with a second mixture to form the formulation to be applied as a coating, the first mixture, comprising polydiethoxy siloxane, a silicone polymer which is functionally terminated at both ends of its molecule, a mono-functionalized silicone polymer which is functionally terminated at only one end of its molecule, and a liquid hydrocarbon;

a second mixture to be mixed with the first mixture comprising titanium isopropoxide; and mica contained in at least one of the first mixture and the second mixture.

16. The kit of claim 15 wherein said first mixture further comprises diphenyl silanediol and cetrimide.

17. The kit of claim 15 wherein said silicone polymer which is functionally terminated at both ends of its molecule is silanol terminated polydimethyl siloxane, said mono-functionalized silicone polymer which is functionally terminated at only one end of its molecule is polydimethyl siloxane (triethyl silane and dimethylcethoxy silane terminated), and said liquid hydrocarbon is polydecene.

18. The kit of claim 15 wherein both said first mixture and said second mixture comprise mica.

19. The kit of claim 15 wherein said first mixture comprises polydiethoxy siloxane, diphenyl silanediol, silanol terminated polydimethyl siloxane, mica, polydimethylsiloxane (triethyl silane and dimethyl ethoxy silane terminated), polydecene, and cetrimide, and said second mixture comprises titanium isopropoxide and mica.

* * * * *